United States Patent [19]

Shoji

[11] 4,330,068

[45] May 18, 1982

[54] THREE-PIECE STRUCTURE MAGNETIC TAPE CASSETTE

[75] Inventor: Shigemasa Shoji, Tokyo, Japan

[73] Assignee: TDK Electronics Co., Ltd., Tokyo, Japan

[21] Appl. No.: 162,836

[22] Filed: Jun. 25, 1980

[30] Foreign Application Priority Data

Jul. 16, 1979 [JP] Japan ........................... 54/96780[U]

[51] Int. Cl.[3] ............................................... B65D 6/12

[52] U.S. Cl. .................................... 220/4 B; 206/387; 242/197; 242/199

[58] Field of Search ................ 242/55.19 A, 197-200, 242/192; 352/72-78; 360/96, 132; 220/4 B, 4 E; 206/389, 387, 391

[56] References Cited

U.S. PATENT DOCUMENTS 3,602,458 8/1971 Doby et al. ......................... 242/199
3,653,608 4/1972 Dickens et al. ..................... 242/199
3,834,650 9/1974 Hall ..................................... 242/192
3,857,531 12/1974 Jantzen ............................... 242/197
4,227,622 10/1980 Okamura et al. ................... 220/4 B

*Primary Examiner*—Leonard D. Christian
*Attorney, Agent, or Firm*—Oblon, Fisher, Spivak, McClelland & Maier

[57] ABSTRACT

A three-piece structure magnetic tape cassette comprises an upper plate, an intermediate frame and a lower plate wherein annular bosses having counter-sunk holes are formed in the upper plate and annular bosses having threaded portions are formed in the lower plate and a seat portion is formed at the intermediate portion in clearance holes of the intermediate frame so that the ends of the annular bosses are brought into contact with the seat portion when the annular bosses are inserted into the clearance holes, and the upper plate, the intermediate frame and the lower plate are connected together with tapping screws.

5 Claims, 3 Drawing Figures

THREE-PIECE STRUCTURE MAGNETIC TAPE CASSETTE

BACKGROUND OF THE INVENTION

1. Field of the Invention

The present invention relates to a magnetic tape cassette. More particularly, it relates to a cassette casing having a three-piece structure in the magnetic tape cassette for easy molding and assembling.

2. Description of the Prior Art

The conventional magnetic tape cassettes have been assembled by connecting together with a screw a pair of half casings made of plastic material and having substantially the same shape. In the conventional tape cassette, it is not easy to prepare the half casing having no deviation from the flat plane because of the deformation caused by the molding of the plastic material. When a pair of half casings are curved in the same direction, the contacting position of a magnetic head in the A side of the tape cassette is not the same as that in the B side thereby causing a difference of sensitivity. On the other hand, when the pair of half casings are curved in a different direction, problems such as a difficulty in the running of the tape, a deviation of track, a deviation of phase etc. will occur. One reason for the occurrence of the deformation in the half casing in the molding derives from the very complicated shape of the half casings in addition to the thermal deformation and the stress deformation of the plastic material.

The inventors of this application have studied to overcome the above-described disadvantages of the conventional magnetic tape cassette and have proposed a magnetic tape cassette having a three-piece structure in which the tape cassette is separated into three pieces; one piece is made of a metallic material to increase the accuracy and the other two pieces are made of a plastic material so as to provide a nearly flat plate in shape thereby providing a simple manufacturing process and an improvement of the size. (Japanese Utility Model Application No. 126245/1977).

FIG. 1 is a schematic view of a disassembled conventional three-piece structure magnetic tape cassette. A description will be simply made with reference to FIG. 1.

The conventional tape cassette comprises an upper plate (1), an intermediate frame (2) and a lower plate (3). The upper plate (1) and the lower plate (3) are formed of a plastic material, preferably a transparent plastic material and the upper surface of the upper plate (1) and the lower surface of the lower plate (3) have substantially the same size as those of the conventional products produced under the specification. The intermediate frame is a supporting frame made by the die-casting of metal such as aluminum and having a plane upper surface and a plane lower surface parallel to each other.

Counter-sunk holes (6) are formed at the four corners and the projecting portion (7) of the upper plate (1) is formed to receive screws (8) for connecting the other two pieces together. Clearance holes (18) are formed in the intermediate frame passing through the same at the positions corresponding to the position of the counter-sunk holes (6) of the upper plate (1). Threaded holes (24) are formed in the lower plate (3) so as to be in alignment with the counter-sunk holes (6) of the upper plate and the clearance holes (18) of the intermediate frame (2), and the threaded holes at the four corners are formed in annular bosses (25) which are fitted in the clearance holes (18) of the intermediate frame (2). Annular bosses (25′) are also formed around the counter-sunk holes (6) at the four corners of the upper plate (1) so that the annular bosses (25′) can be fitted to the clearance holes (18) of the intermediate frame (2). (FIG. 2).

The upper plate (1), the intermediate frame (2) and the lower plate (3) are assembled together by fitting the annular bosses (25′) of the upper plate (1) and the annular bosses (25) of the lower plate (3) to the clearance holes (18) of the intermediate frame (2) respectively and by screwing with tapping screws (8) into these holes to fix them in one piece as shown in FIG. 2. However, as is understood from the figure, the thickness of the walls of the outer peripheral portion (2′) of the four corners in the intermediate frame (2) is very slight because the clearance holes (18) for receiving the annular bosses (25′) of the upper plate (1) and the annular bosses (25) of the lower plate (3) should be formed at those parts thereby substantially reducing the strength. The formation of the thin part hinders the supply of molten plastic material during the molding operation thereby possibly providing an incompletely molded product.

SUMMARY OF THE INVENTION

It is an object of the present invention to provide a three-piece structure magnetic tape cassette easily molded and assembled in which a seat permitting a tapping screw to pass through is formed in clearance holes of an intermediate frame to reinforce thin portions of the intermediate frame.

The foregoing and other objects of the present invention have been attained by providing a three-piece structure magnetic tape cassette comprising an upper plate, an intermediate frame and a lower plate wherein annular bosses having counter-sunk holes are formed in the upper plate and annular bosses having threaded portions are formed in the lower plate and a seat portion is formed at the intermediate portion in clearance holes of the intermediate frame so that the ends of the annular bosses are brought into contact with the seat portion when the annular bosses are inserted into the clearance holes, and the upper plate, the intermediate frame and the lower plate are connected together with tapping screws.

DETAILED DESCRIPTION OF THE PREFERRED EMBODIMENTS

Figure 1:
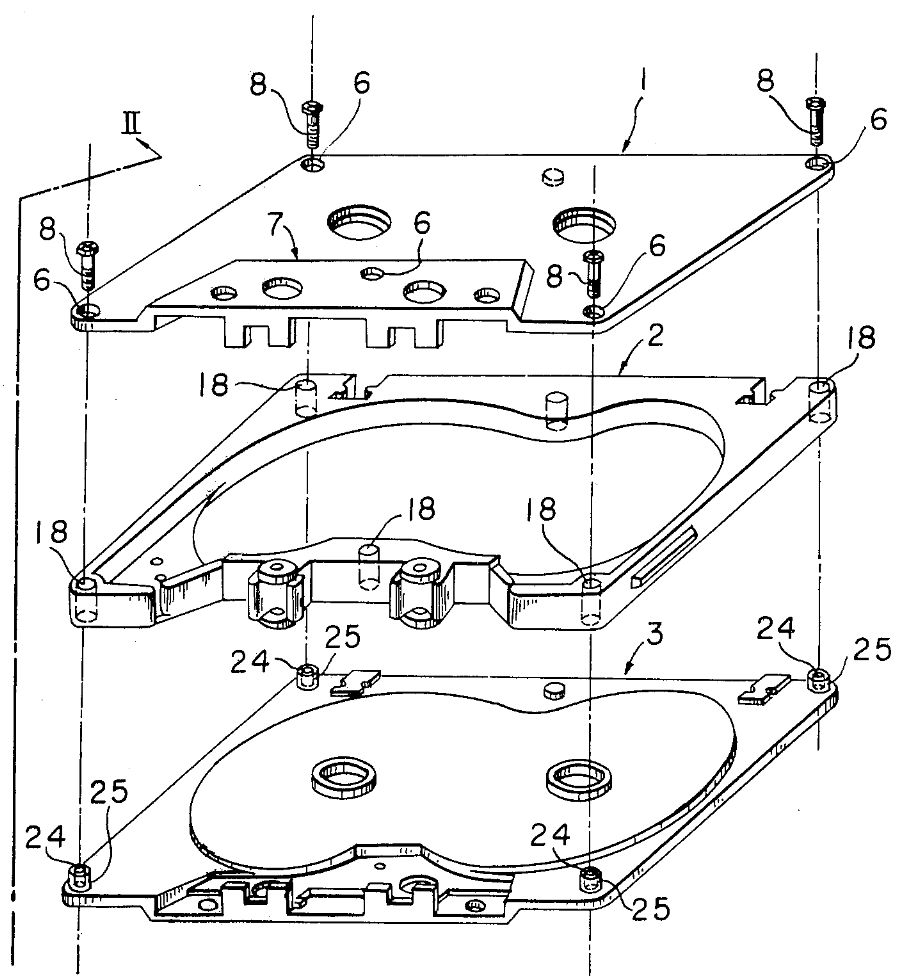
FIG. 1 is a schematic view of a disassembled conventional three-piece structure magnetic tape cassette.
Figure 2:
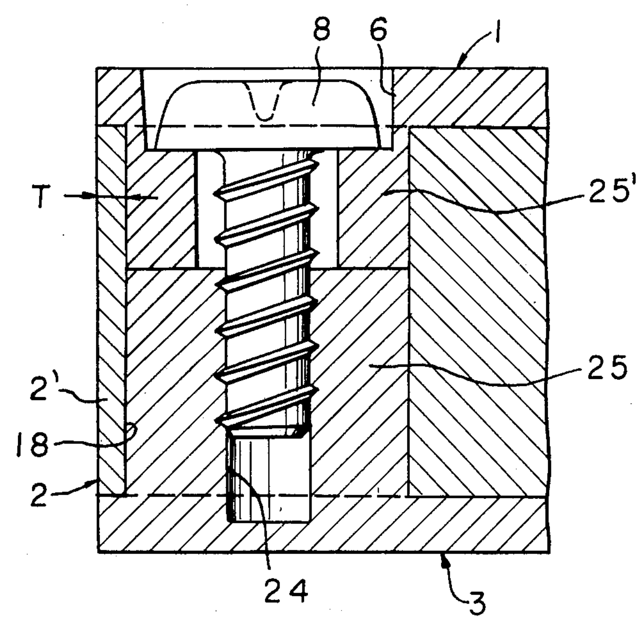
FIG. 2 is a partially enlarged cross sectional view of an assembled conventional cassette taken along II—II line of FIG. 1.

Referring to the drawings, one embodiment of the present invention will be described.

Figure 3:
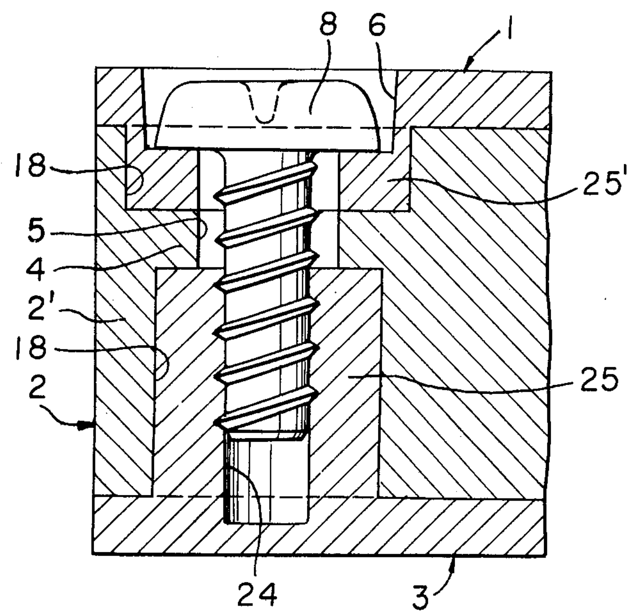
FIG. 3 is a cross sectional view similar to FIG. 2 of a magnetic tape cassette according to the present invention.

FIG. 3 is a cross sectional view of the assembled three-piece structure magnetic tape cassette. As is clear from the figure, a seat portion (4) is formed in the clearance hole (18). The seat portion (4) is preferably formed in the middle of the clearance hole (18) so that the annular boss (25′) of the upper plate (1) can be inserted into the upper part of the clearance hole (18), while the annular boss (25) of the lower plate (3) can be inserted into the lower part of the clearance hole (18). It is preferable that the end of the annular boss (25') of the upper plate (1) is brought into contact with the upper surface of the seat portion (4) and the end of the annular boss (25) of the lower plate (3) is brought into contact with the lower surface of the seat portion to provide a rigid structure as one piece. However, if desired, slight gaps may be formed between the end of the annular bosses and the surfaces of the seat portion. In this case, the accuracy of the size of the parts is not strictly required and the assembling operation is also easily attained.

In FIG. 3, the diameter of the upper part of the clearance hole is different from that of the lower part thereof. However, the diameter of the clearance hole can be the same size. The outer diameters of the annular bosses (25') and (25) should correspond to the inner diameter of the clearance hole (18). A clearance hole (5) is formed in the seat portion (4) so as to be in alignment with the countersunk hole (6) of the upper plate and the threaded hole (24) of the lower plate (3).

In the three-piece structure magnetic tape cassette according to the present invention, the seat portion (4) of the intermediate frame (2) is clamped by the annular boss (25') of the upper plate (1) and the annular boss (25) of the lower plate (3) by connecting the three members with the tapping screw (8) into one piece. Accordingly, the thin portion (2') in the intermediate frame is reinforced by the seat portion (4). In the molding of the intermediate frame, the feeding of molten plastic material to the thin portion can be effectively attained because the seat portion (4) is formed in one piece with the thin portion (2').

In accordance with the present invention, the three-piece structure magnetic tape cassette has a remarkably rigid structure, and provides an easy molding operation and assembling operation.

I claim:

1. In a three-piece structure magnetic tape cassette comprising an upper plate, an intermediate frame having a clearance hole and a lower plate, an improvement characterized in that a seat portion is formed at the intermediate part in said clearance hole of the intermediate frame; an annular boss having a counter-sunk hole and having a length sufficient to fit in the upper part of the clearance hole is formed in the upper plate and an annular boss having a threaded hole and having a length sufficient to fit in the lower part of the clearance hole is formed in the lower plate so that the three pieces are connected in one piece by threading a tapping screw through the counter-sunk hole and the seat portion to the threaded hole.

2. A magnetic tape cassette according to claim 1 wherein the end of the annular boss of the upper plate and the end of the annular boss of the lower plate are in contact with the surface of the seat portion to clamp the same when assembled.

3. A magnetic tape cassette according to claim 1 wherein the outer diameters of the annular bosses of the upper plate and the lower plate correspond to the inner diameter of the clearance hole.

4. A magnetic tape cassette according to claim 3 wherein the diameter of the upper part of the clearance hole is different from that of the lower part.

5. A magnetic tape cassette according to claim 3 wherein the diameter of the upper part of the clearance hole is the same as that of the lower part.

* * * * *